US008958992B2

(12) United States Patent
Macy et al.

(10) Patent No.: US 8,958,992 B2
(45) Date of Patent: Feb. 17, 2015

(54) SYSTEM, METHOD, AND COMPUTER PROGRAM PRODUCT FOR MANAGING A RESEARCH SEED LOCATION

(75) Inventors: Ted S. Macy, Cumming, GA (US); Loren Steenhoek, Ankeny, IA (US)

(73) Assignee: Pioneer Hi Bred International Inc, Johnston, IA (US)

( * ) Notice: Subject to any disclaimer, the term of this patent is extended or adjusted under 35 U.S.C. 154(b) by 973 days.

(21) Appl. No.: 13/090,866

(22) Filed: Apr. 20, 2011

(65) Prior Publication Data

US 2011/0270529 A1    Nov. 3, 2011

Related U.S. Application Data

(60) Provisional application No. 61/328,913, filed on Apr. 28, 2010.

(51) Int. Cl.
G01N 33/48      (2006.01)
A01C 21/00     (2006.01)
G06Q 50/04     (2012.01)

(52) U.S. Cl.
CPC .............. *A01C 21/00* (2013.01); *G06Q 50/04* (2013.01)
USPC ......................................................... 702/19

(58) Field of Classification Search
CPC ......... G06F 19/26; G06F 19/24; A01C 21/00; G06Q 99/00
See application file for complete search history.

(56) References Cited

U.S. PATENT DOCUMENTS

| 5,646,846 A | 7/1997 | Bruce et al. |
| 5,913,915 A | 6/1999 | McQuinn |
| 5,955,973 A | 9/1999 | Anderson |
| 6,089,743 A | 7/2000 | McQuinn |
| 6,122,581 A | 9/2000 | McQuinn |
| 6,199,000 B1 | 3/2001 | Keller et al. |
| 6,236,907 B1 | 5/2001 | Hauwiller et al. |
| 6,386,128 B1 | 5/2002 | Svoboda et al. |
| 6,505,124 B2 | 1/2003 | Carr et al. |
| 6,505,146 B1 | 1/2003 | Blackmer |

(Continued)

FOREIGN PATENT DOCUMENTS

| WO | WO 2007/067579 A2 | 6/2007 |
| WO | WO 2009/143399 A2 | 11/2009 |

OTHER PUBLICATIONS

International Search Report and Written Opinion from International Application No. PCT/US2011/033511, mailed Oct. 26, 2011.

(Continued)

*Primary Examiner* — Elias Desta
(74) *Attorney, Agent, or Firm* — Pioneer Hi Bred Int'l Inc.

(57) ABSTRACT

The present invention provides a system, method and computer program product for managing a research seed location. In various embodiments, the method of the present invention comprises storing at least one field characteristic layer in a memory, storing at least one the research plot layer in a memory, and merging the research plot layer and the field characteristic layer via a processor. In some embodiments, the research plot plan may be linked to a research plot database. In some embodiments, plant observation data and/or plant harvest data may be collected and may be merged with the research plot plan. In some embodiments, a seed planting device may be controlled to plant seeds according to the research plot plan.

23 Claims, 17 Drawing Sheets

(56) References Cited

U.S. PATENT DOCUMENTS

| | | |
|---|---|---|
| 6,510,367 B1 | 1/2003 | McQuinn |
| 6,516,271 B2 | 2/2003 | Upadhyaya et al. |
| 6,516,733 B1 | 2/2003 | Sauder et al. |
| 6,553,299 B1 | 4/2003 | Keller et al. |
| 6,553,312 B2 | 4/2003 | Upadhyaya et al. |
| 6,671,698 B2 | 12/2003 | Pickett et al. |
| 6,672,228 B1 | 1/2004 | Groelz et al. |
| 6,760,654 B2 | 7/2004 | Beck |
| 6,810,315 B2 | 10/2004 | Cessac |
| 6,941,225 B2 | 9/2005 | Upadhyaya et al. |
| 6,997,120 B2 | 2/2006 | Gabriel |
| 7,184,892 B1 | 2/2007 | Dyer et al. |
| 7,197,992 B2 | 4/2007 | Gabriel |
| 7,472,659 B2 | 1/2009 | Gabriel |
| 7,509,199 B2 | 3/2009 | Rekow |
| 2003/0187560 A1 | 10/2003 | Keller et al. |
| 2006/0278143 A1 | 12/2006 | Deppermann et al. |
| 2009/0259483 A1 | 10/2009 | Hendrickson et al. |
| 2013/0229647 A1* | 9/2013 | Fredlund et al. ............... 356/51 |

OTHER PUBLICATIONS

The Step 4 Precision Planter Utilizing Global Plot Management Product Information; Seed Research Equipment Solutions (SRES) (3 pgs.) downloaded from www.sresweb.com on Apr. 20, 2011.

The SRES Precision Planters Product Brochure, Seed Research Equipment Solutions (SRES) (12 pgs) downloaded from www.sresweb.com on Apr. 20, 2011.

Almaco SkyTrip GPS Software User Manual; Mar. 2009 (18 pgs.).

* cited by examiner

FIG. 17

SYSTEM, METHOD, AND COMPUTER PROGRAM PRODUCT FOR MANAGING A RESEARCH SEED LOCATION

CROSS-REFERENCE TO RELATED APPLICATIONS

The present application claims priority from U.S. Provisional Application No. 61/328,913 filed Apr. 28, 2010, which is hereby incorporated herein by reference in its entirety.

FIELD OF THE INVENTION

The various embodiments of the present invention relate generally to a system, method, and computer program product for managing a research seed location. More specifically, embodiments of the present invention provide a system, method, and computer program product for arranging, planting, and recording information specific to seed research plots using geospatial information tools.

BACKGROUND OF THE INVENTION

It is typical for a company in the agricultural seed industry to generate one or more research plots in a research seed location in order to evaluate certain seed varieties. Such seed varieties may include, but need not be limited to, seeds from a specific source, genotype, population, and/or breeding line. In such a manner, researchers may evaluate various features of the plants growing in the research plot, as well as features of any crops produced from the plants. In some instances these features may be compared to plants grown from different seed varieties in the research plot. Thus, certain experiments may require a researcher to plant many different seed varieties in the research plot at approximately the same time. Additionally, a researcher may desire to plant various seed varieties in relatively close proximity to other seed varieties.

Typically, seed research plots are planted in an arrangement of ranges and rows whereby one or more rows constitutes a plot or generally a unique seed genetic composition to be reproduced or evaluated. An alley, typically oriented perpendicular to the rows and for a defined width separates the plots into ranges for a matrix arrangement of seed plots within an experiment or experimental research field layout.

Seed research plot planters are configured to deliver a planting arrangement in ranges and rows via seed handling and metering apparatus consisting of mechanical, electromechanical, and pneumatic components generally controlled via some type of micro processor, computer, or programmable logic controller. In order to track the location of various seed varieties, a map may be manually created that describes the locations of the seeds based on the planned distribution of seeds. Often, the map is generated before seeds are planted in the research field and the map represents where the seeds are intended to be planted in the research plot. However, these maps are generated without reference to the characteristics of the research seed location, and no geospatial information or logic is executed to arrange, place, or exclude planting of plots to achieve or verify a desired planting arrangement. Data may also be gathered about plants that grow from the seeds planted in a research seed location, as well as after the plants have been harvested. However, such data is recorded in a notebook and, moreover, is not readily associated with other aspects of the research seed location.

As a result a need exists for a system, method, and computer program product for managing a research seed location. In various embodiments, the system, method, and computer program product should provide for arranging, planting, and recording information specific to seed research plots using geospatial information tools. In addition, the system, method, and computer program product should provide linking of data with a research plot database.

SUMMARY OF VARIOUS EMBODIMENTS

The present invention addresses the above needs and achieves other advantages by providing a system, method, and computer program product for managing a research seed location. In one embodiment, a method is provided that comprises storing at least one field characteristic layer in a memory, the field characteristic layer representing a geospatial area, storing at least one research plot layer in a memory, the research plot layer also representing a geospatial area, and merging the research plot layer and the field characteristic layer via a processor to create a research plot plan for the research seed location. Some embodiments may further comprise linking the research plot plan with a research plot database. In some embodiments, the research plot layer may include plot data, and the plot data may include a unique identifier used to link the plot plan with the research plot database. In some embodiments, the field characteristic layer may include field data selected from the group consisting of: ownership boundaries, soil types, drainage areas, obstacles, waterways, field topography, previous yield data, previous field treatments, tramlines/controlled traffic areas, irrigation patterns, and combinations thereof. In some embodiments, the research plot layer may include plot data selected from the group consisting of: experiment boundaries, plot boundaries, desired seed population within a plot, desired seed genetic identity within a plot, field treatments, seed treatments, plant growth data, harvest data, wind resistance data, and combinations thereof. In some embodiments, the plot data may include plant growth data, and the plant growth data may be selected from the group consisting of: plant emergence rate, plant germination rate, number of leaves as a function of time, plant height data, ear height data, and combinations thereof. In some embodiments, at least a portion of the geospatial area of the field characteristic layer and the geospatial area of the research plot layer may overlap. In some embodiments, merging the research plot layer and the field characteristic layer may comprise applying an algorithm to the field characteristic layer and the research plot layer.

Some embodiments may further comprise controlling a seed planting device to plant seeds according to the research plot plan. In some embodiments, the research plot layer may include one or more plot boundaries and controlling the seed planting device may comprise controlling the seed planting device to plant seeds within the plot boundaries. In some embodiments, the plot boundaries may be represented by polygons. Some embodiments may further comprise collecting at least one of plant observation data and plant harvest data, and merging the collected data with the research plot plan. Some embodiment may further comprise recording the geospatial location of seeds planted in the research seed location to create an as-planted map. Some embodiments may further comprise comparing the research plot plan to the as-planted map.

The present invention also provides a computer program product comprising at least one computer-readable storage medium having computer-executable program code instructions stored therein for managing a research seed location. In one embodiment the computer-executable program code instructions comprise program code instructions for storing at least one field characteristic layer in a memory, the field characteristic layer representing a geospatial area, program code instructions for storing at least one research plot layer in a memory, the research plot layer also representing a geospatial area, and program code instructions for merging the research plot layer and the field characteristic layer to create a research plot plan for the research seed location. Some embodiments may further comprise program code instructions for linking the research plot plan with a research plot database. In some embodiments the research plot layer may include plot data, and the plot data may include a unique identifier used to link the plot plan with the research plot database. In some embodiments, the field characteristic layer may include field data selected from the group consisting of: ownership boundaries, soil types, drainage areas, obstacles, waterways, field topography, previous yield data, previous field treatments, tramlines/controlled traffic areas, irrigation patterns, and combinations thereof. In some embodiments, the research plot layer may include plot data selected from the group consisting of: experiment boundaries, plot boundaries, desired seed population within a plot, desired seed genetic identity within a plot, field treatments, seed treatments, plant growth data, harvest data, wind resistance data, and combinations thereof. In some embodiments, the plot data may include plant growth data, and the plant growth data may be selected from the group consisting of: plant emergence rate, plant germination rate, number of leaves as a function of time, plant height data, ear height data, and combinations thereof. In some embodiments, at least a portion of the geo spatial area of the field characteristic layer and the geospatial area of the research plot layer may overlap. In some embodiments, the program code instructions for merging the research plot layer and the field characteristic layer may include instructions for applying an algorithm to the field characteristic layer and the research plot layer.

Some embodiments may further comprise program code instructions for controlling a seed planting device to plant seeds according to the research plot plan. In some embodiments, the research plot layer may include one or more plot boundaries and the program code instructions for controlling the seed planting device may include instructions for controlling the seed planting device to plant seeds within the plot boundaries. Some embodiments may further comprise program code instructions for merging collected data comprising at least one of plant observation data and plant harvest data with the research plot plan. Some embodiments may further comprise program code instructions for recording geospatial locations of seeds planted in the research seed location and program code instructions for creating an as-planted map. Some embodiments may further comprise program code instructions for comparing the research plot plan to the as-planted map.

BRIEF DESCRIPTION OF THE DRAWINGS

Figure 1:
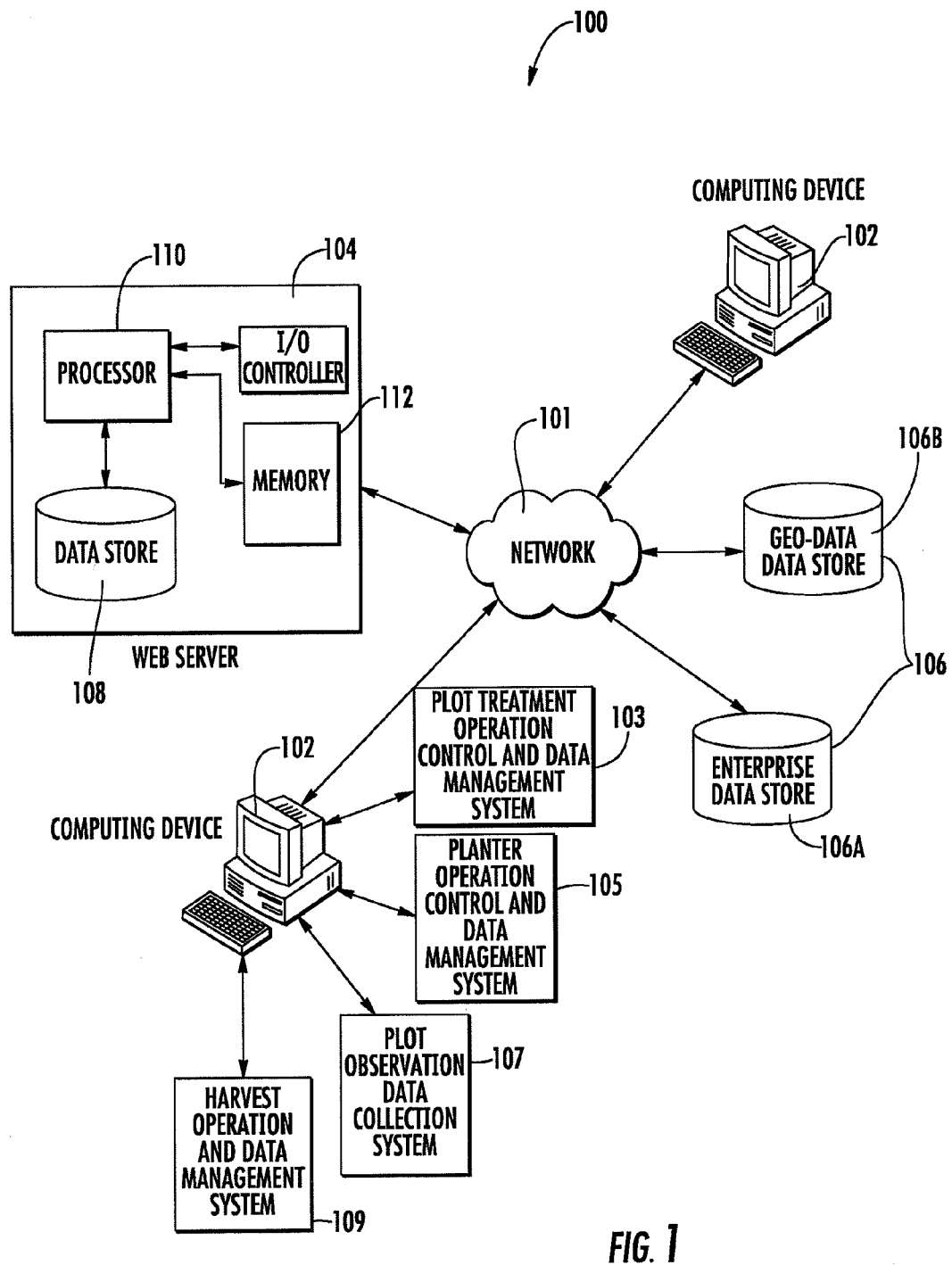

Having thus described the invention in general terms, reference will now be made to the accompanying drawings, which are not necessarily drawn to scale, and wherein:

FIG. 1 illustrates an example of a typical network environment in which the system, method, and computer program product of the present invention may operate.

Figure 2:
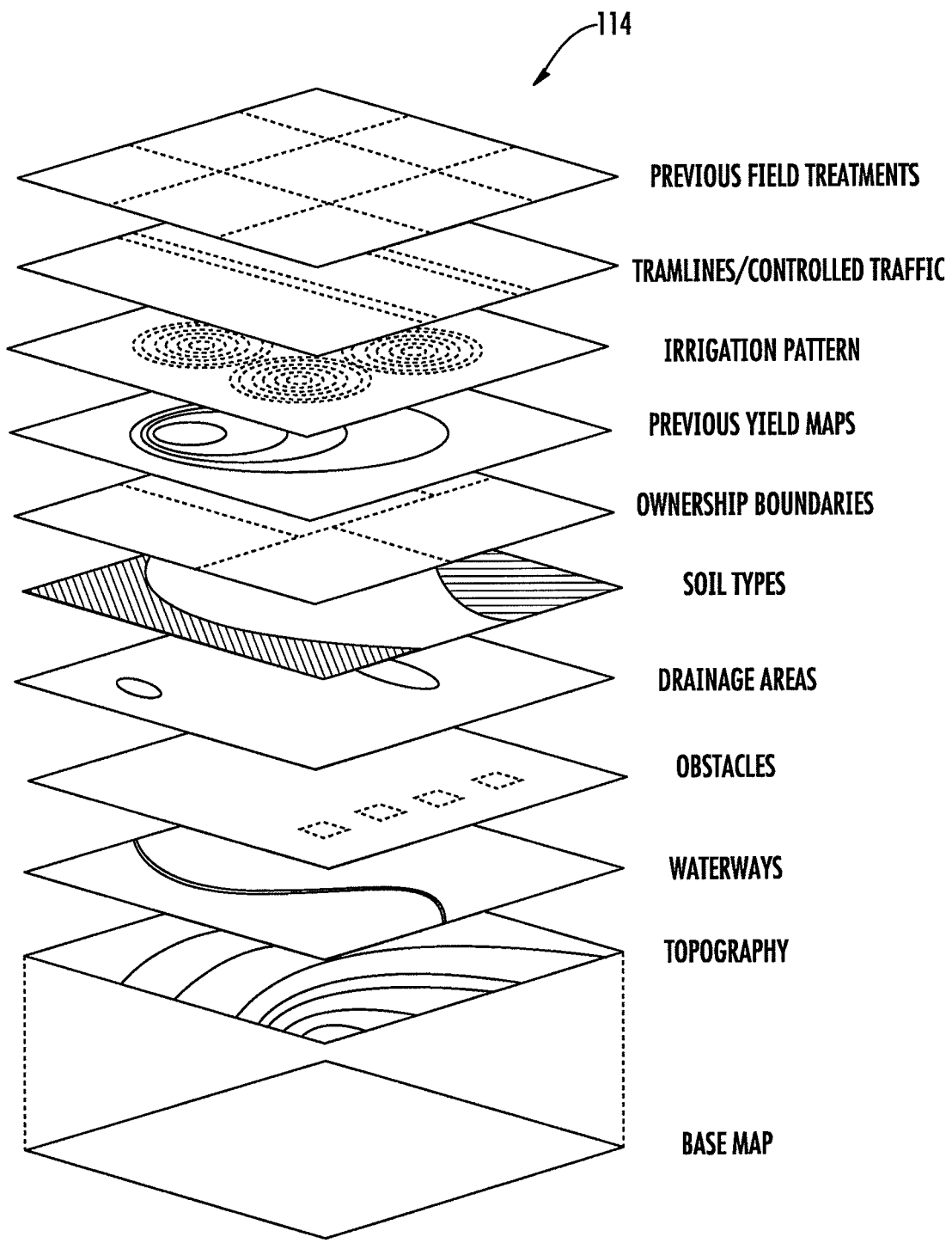
Figure 3:
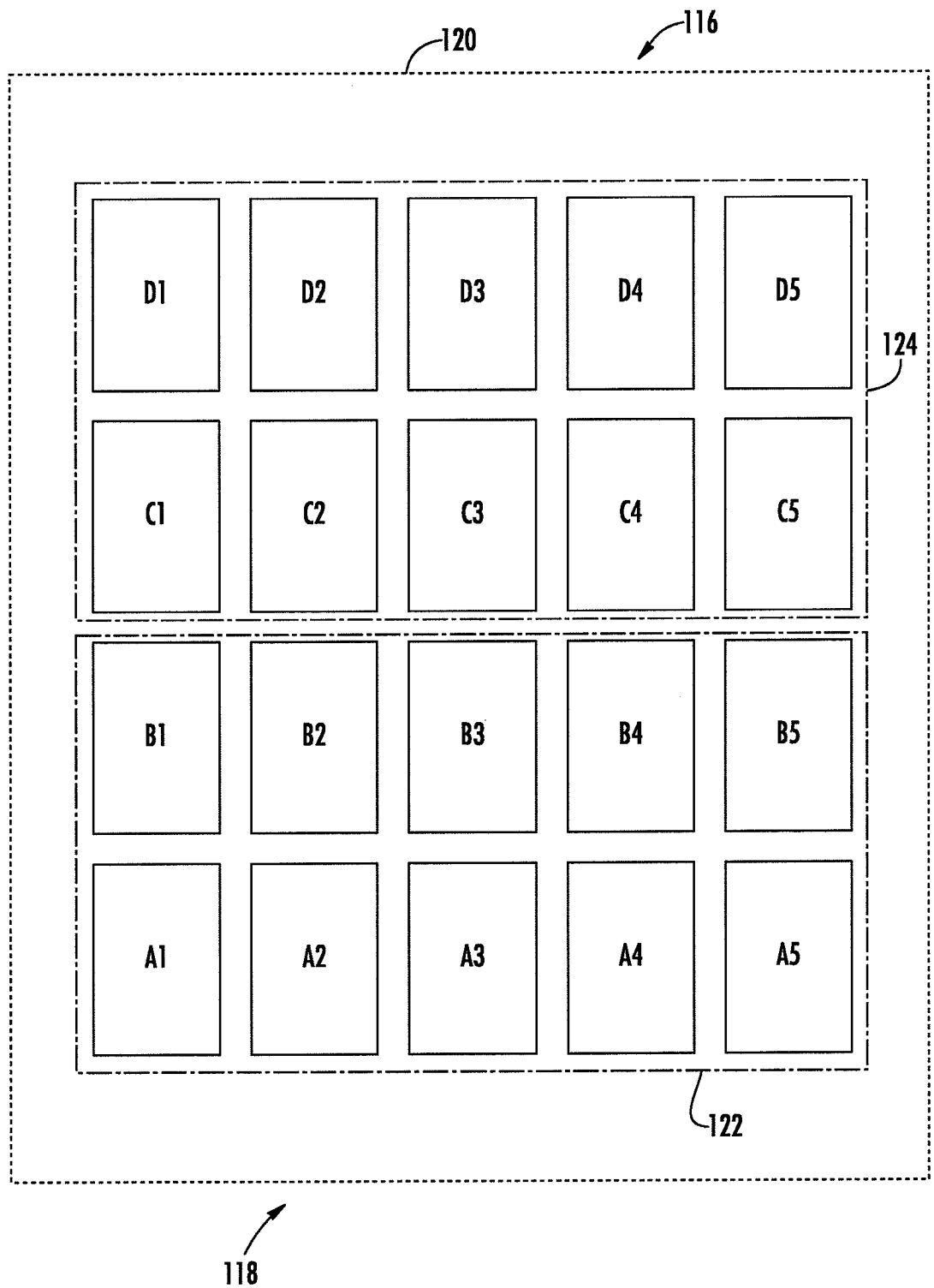
Figure 4:
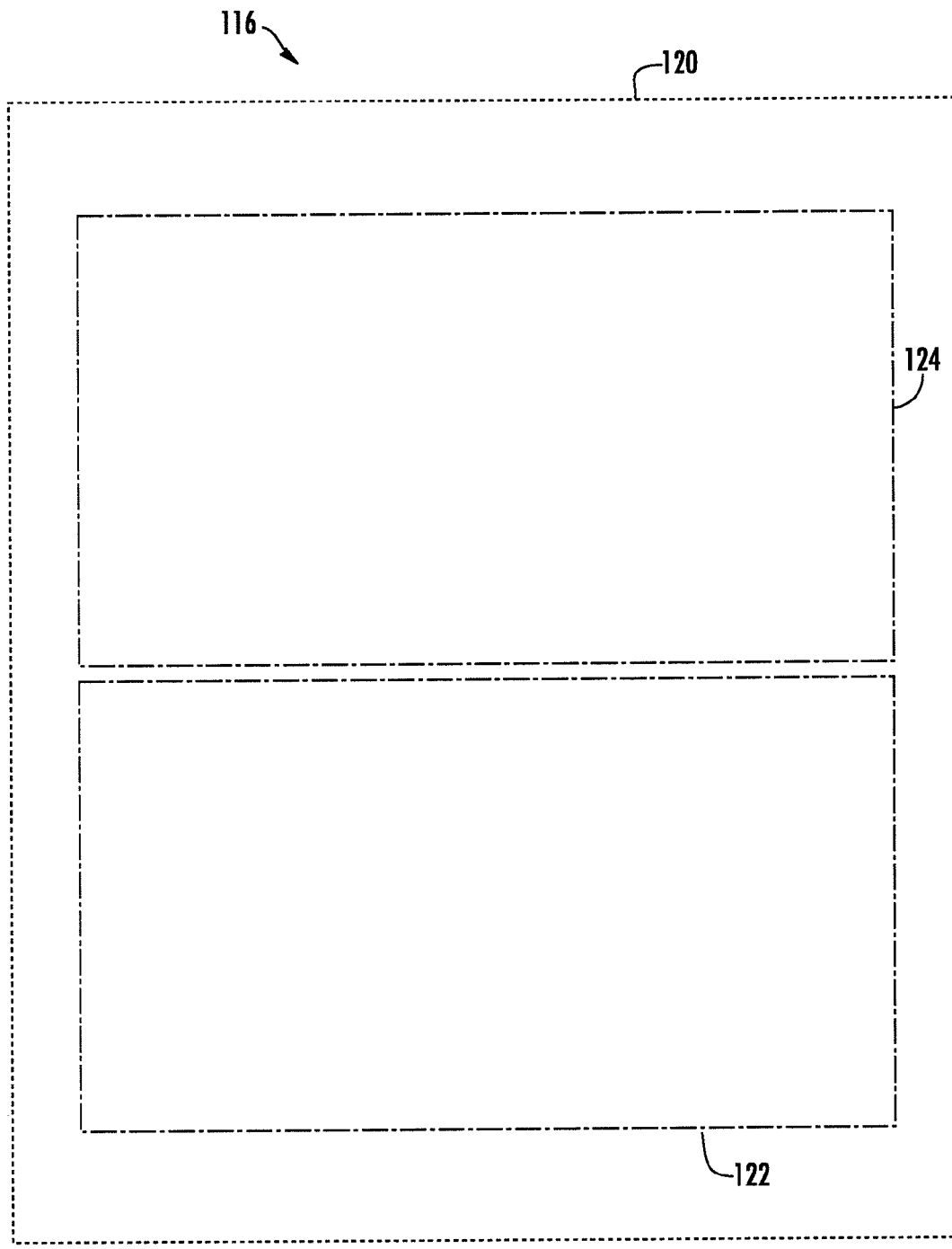
Figure 5:
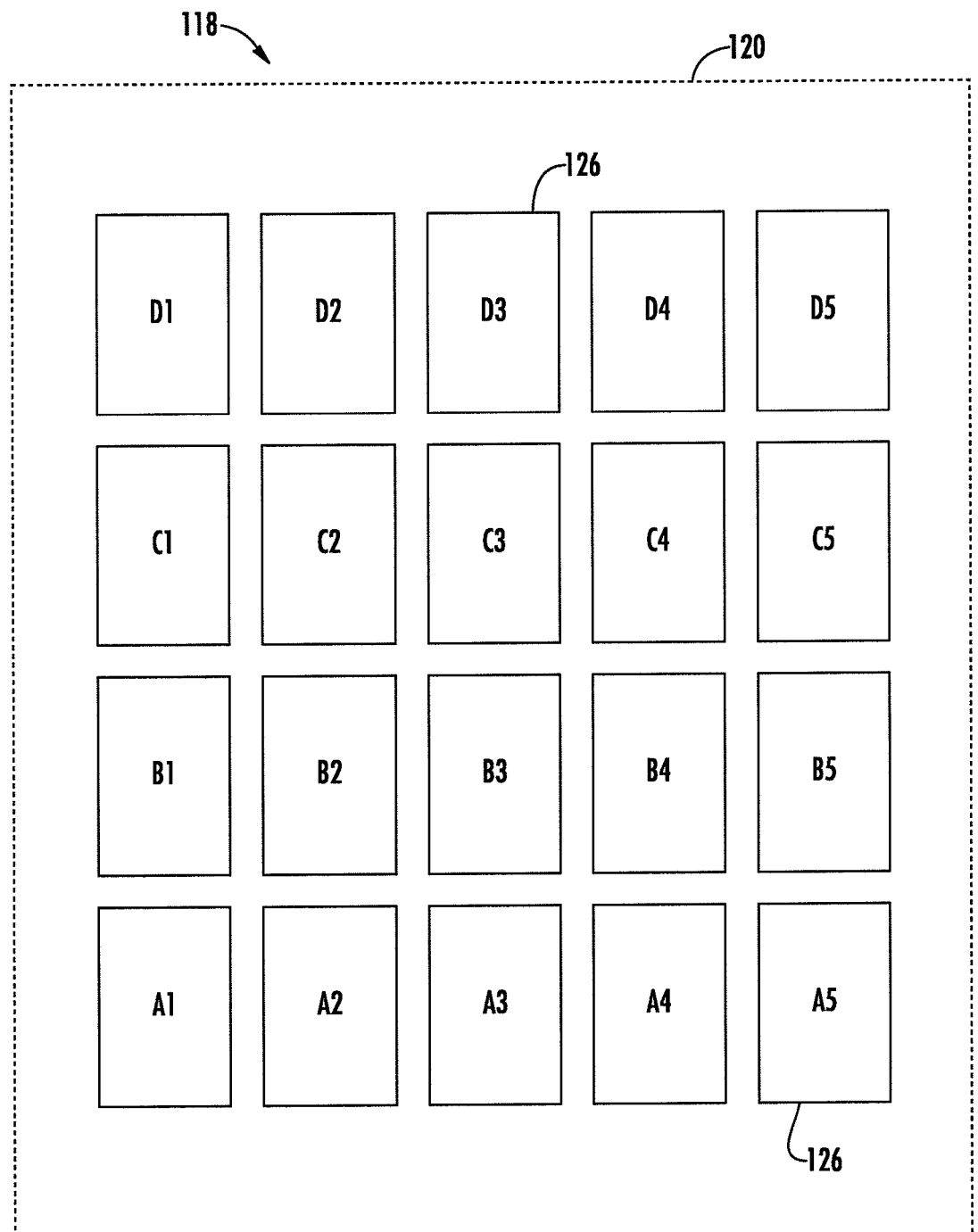
Figure 6:
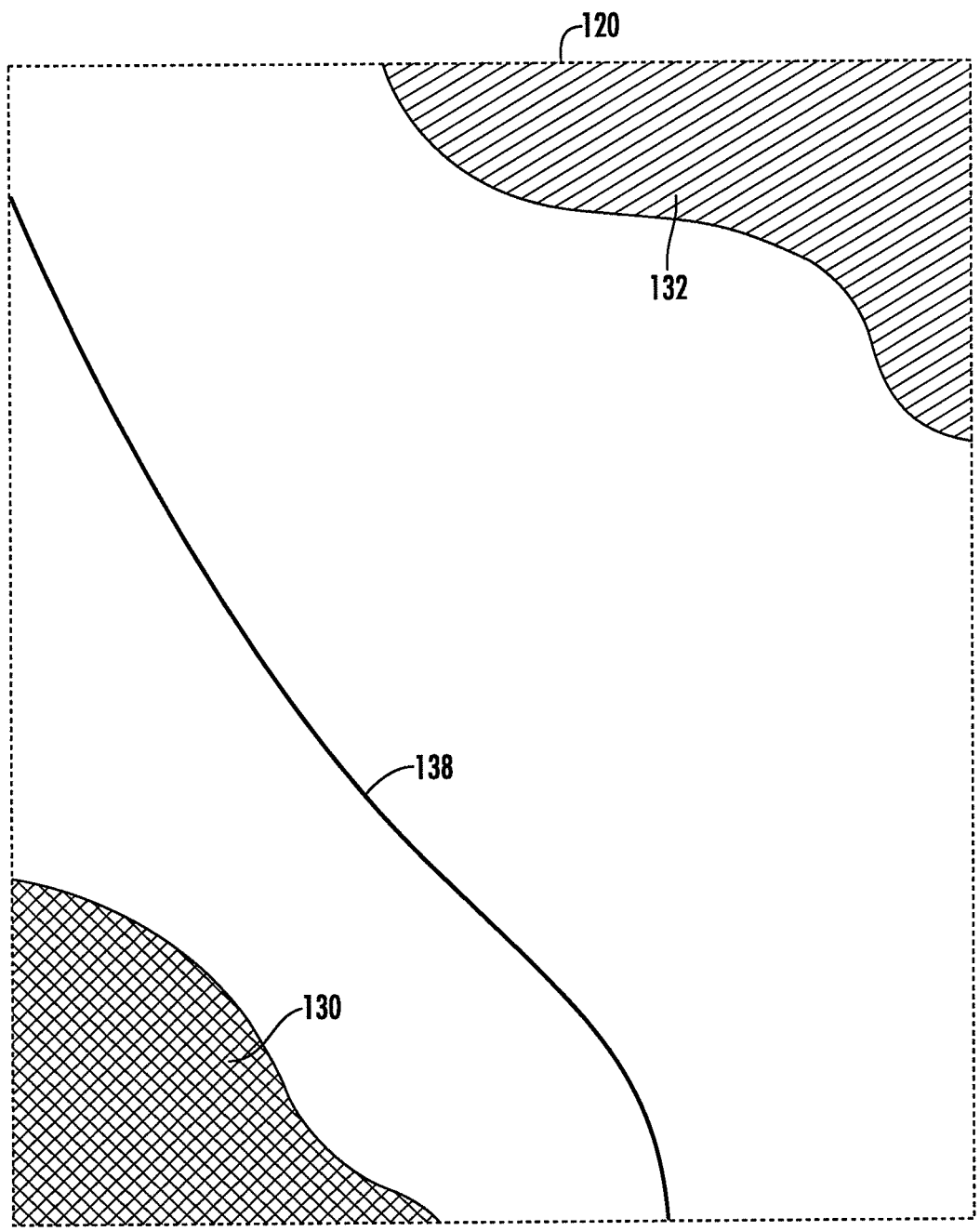
Figure 7:
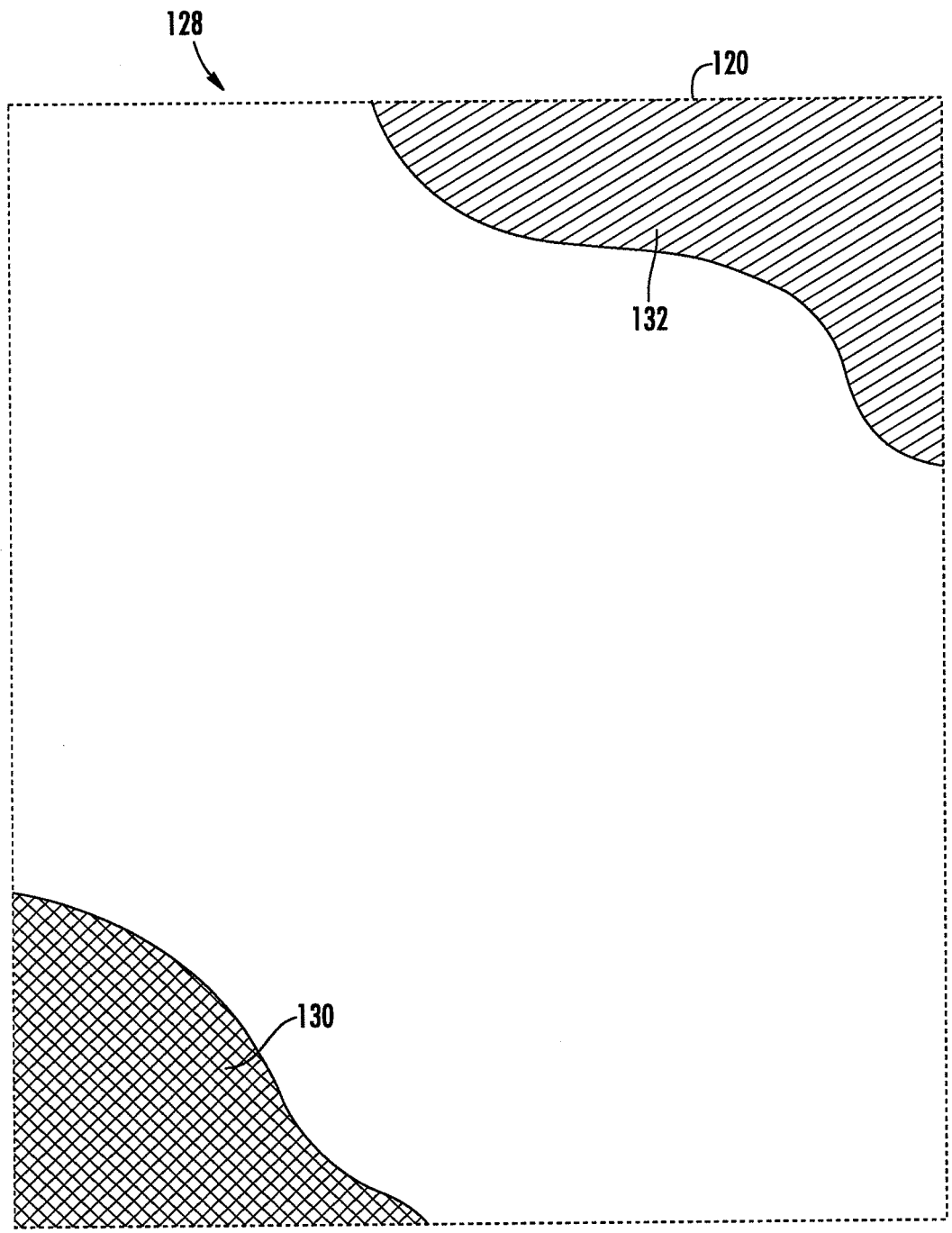
Figure 8:
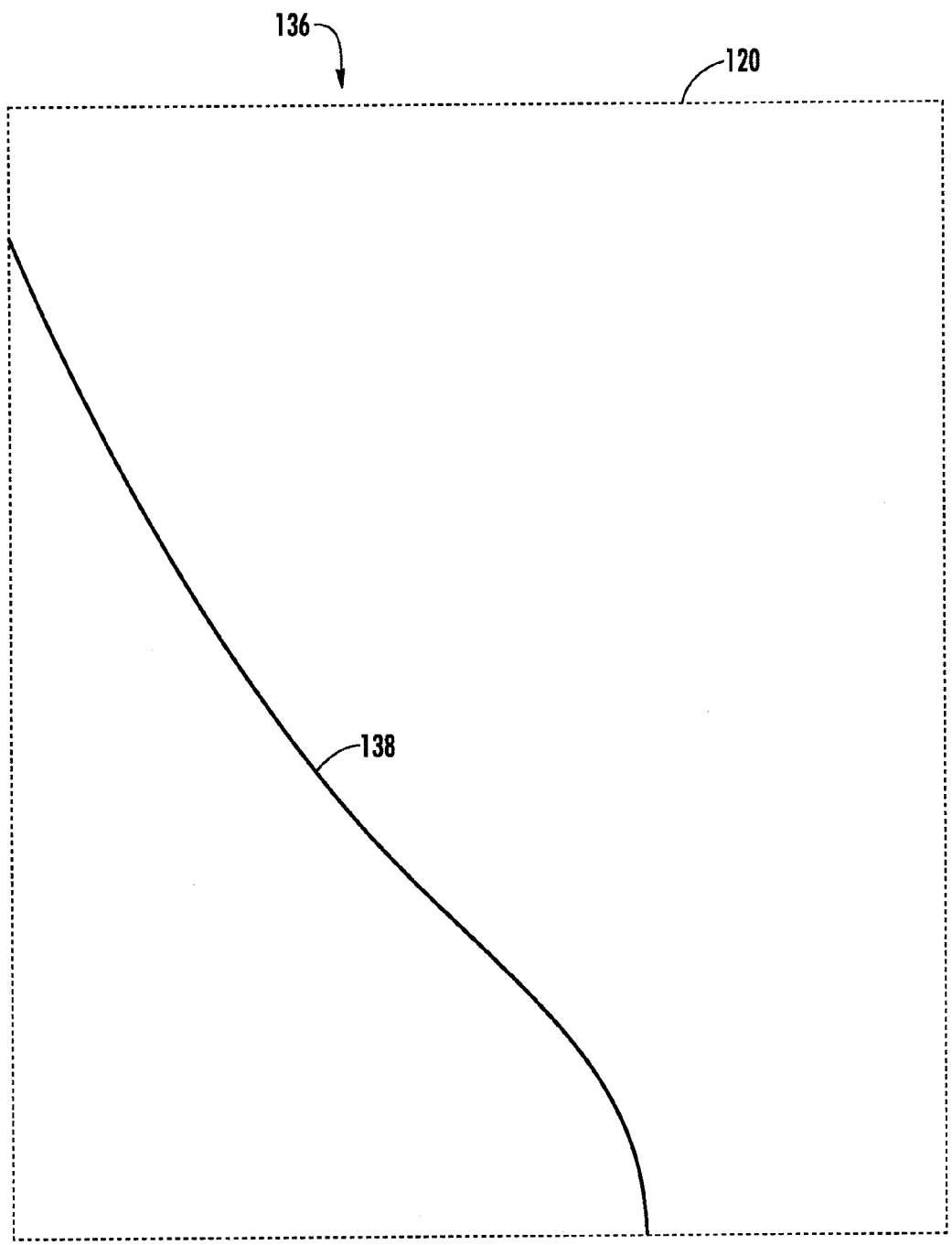
Figure 9:
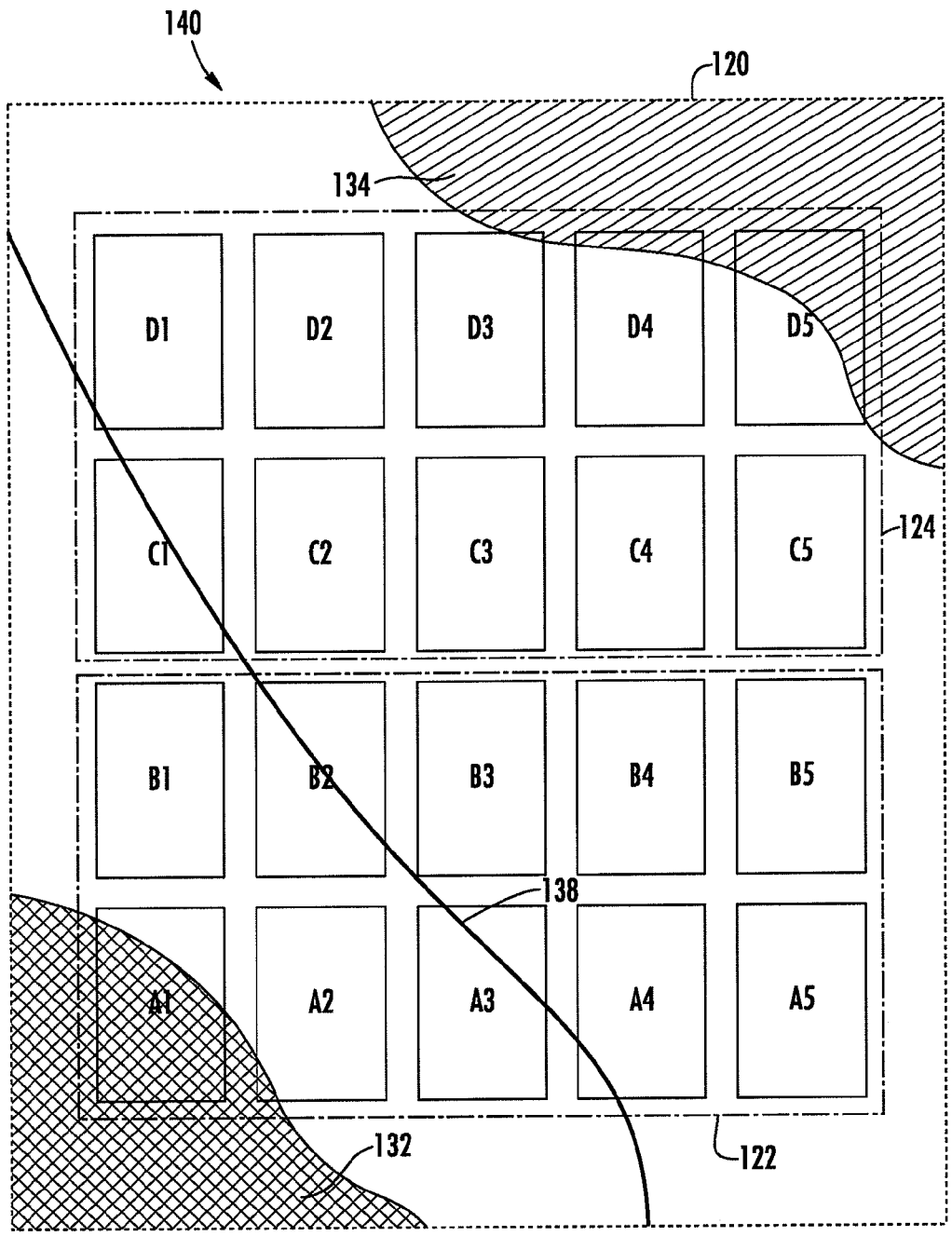
Figure 10:
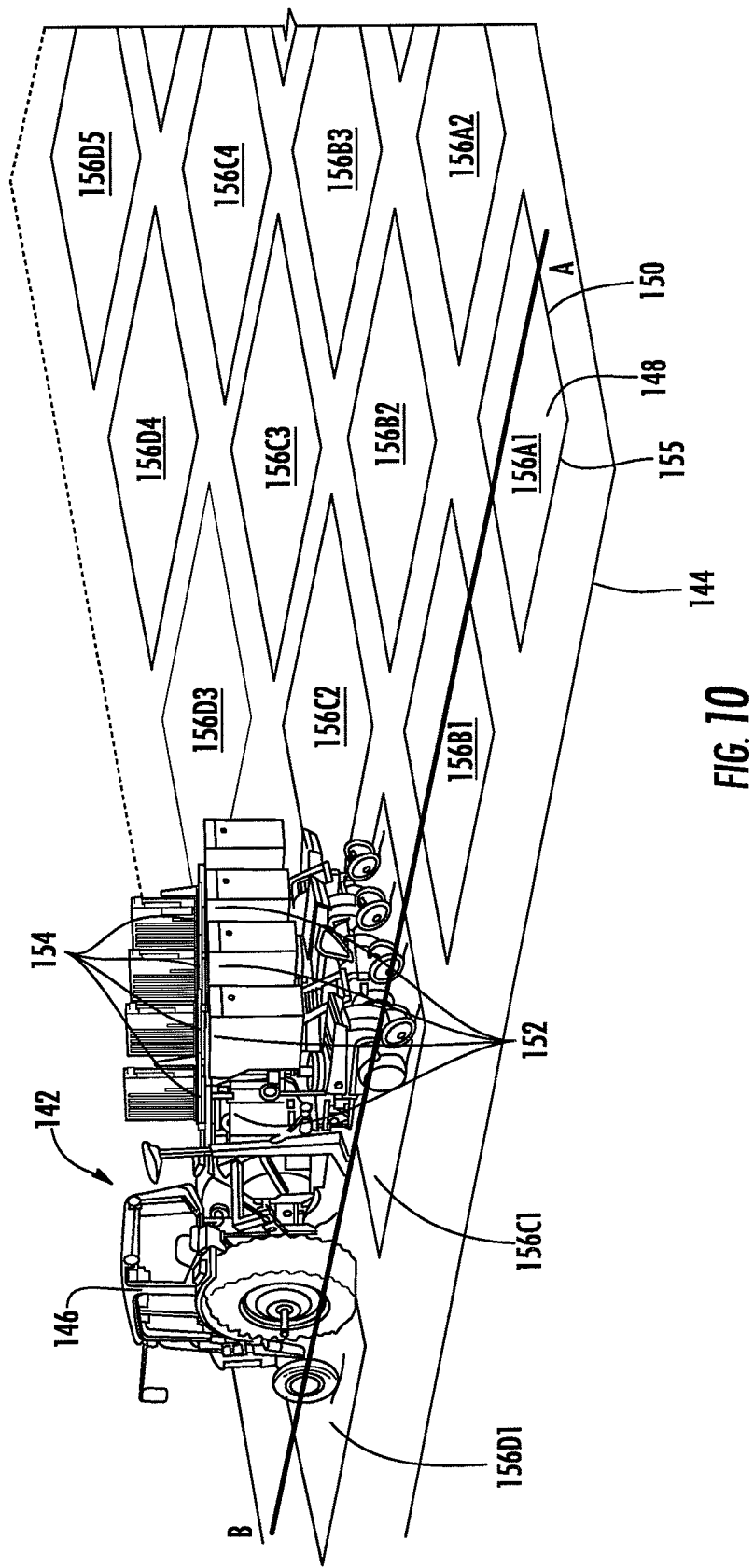
Figure 11:
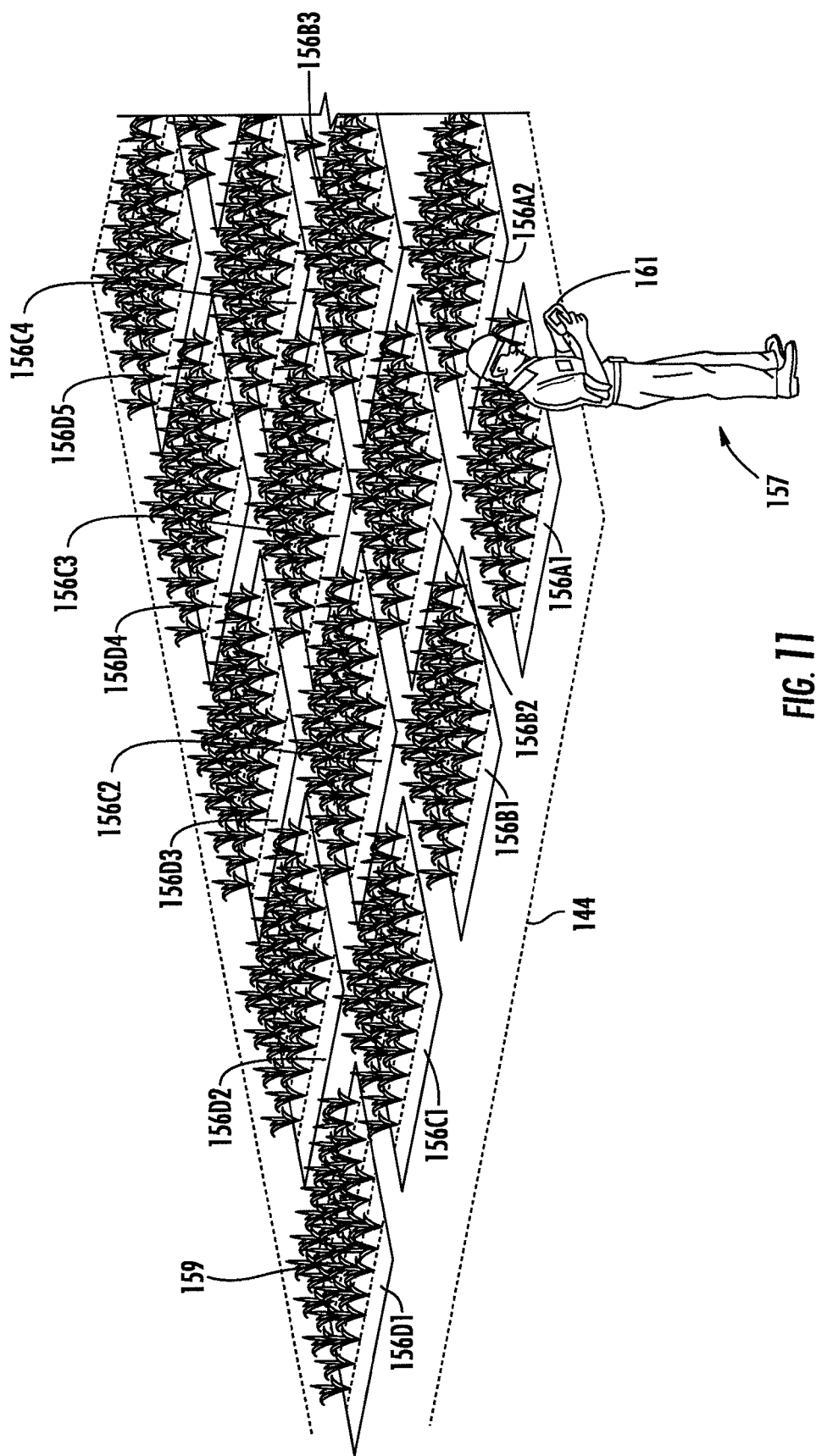
Figure 12:
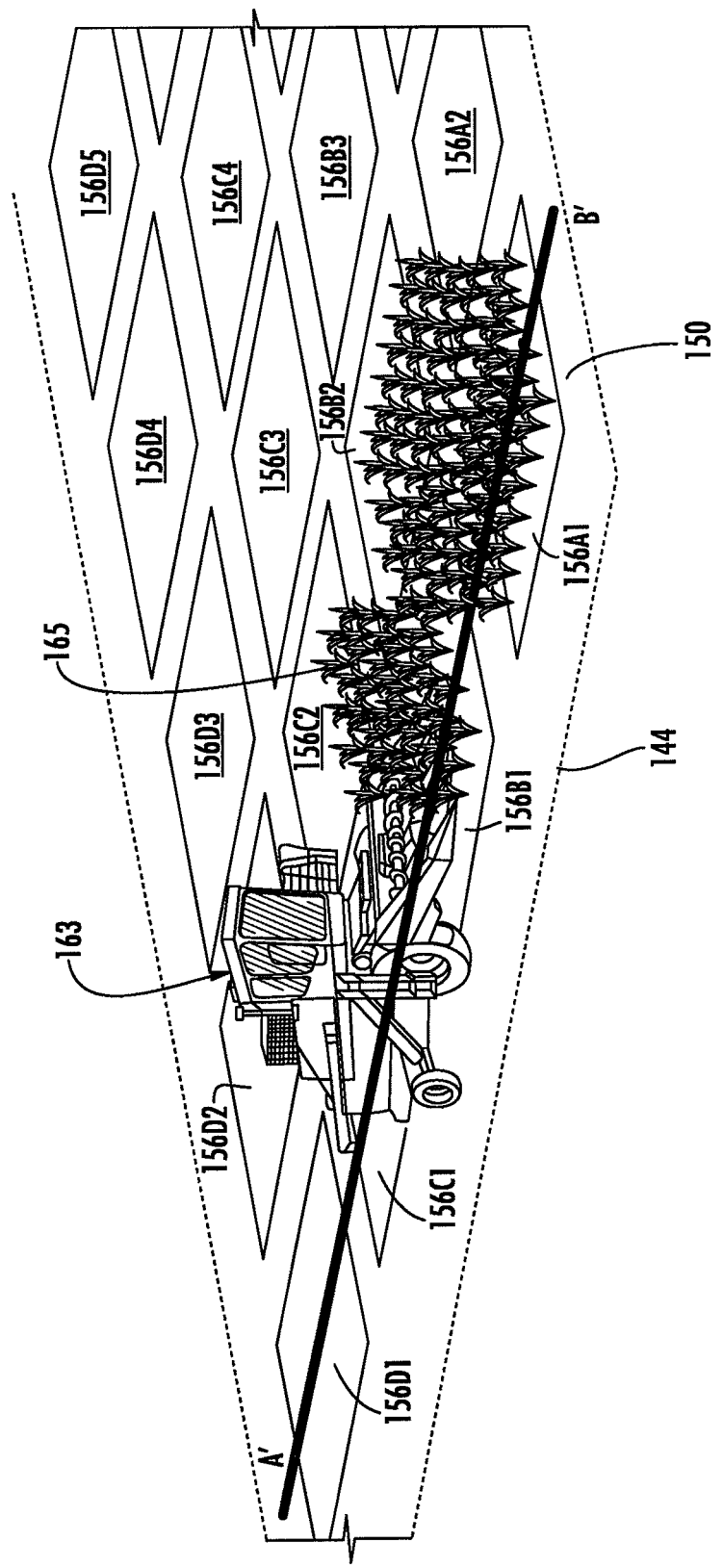
Figure 13:
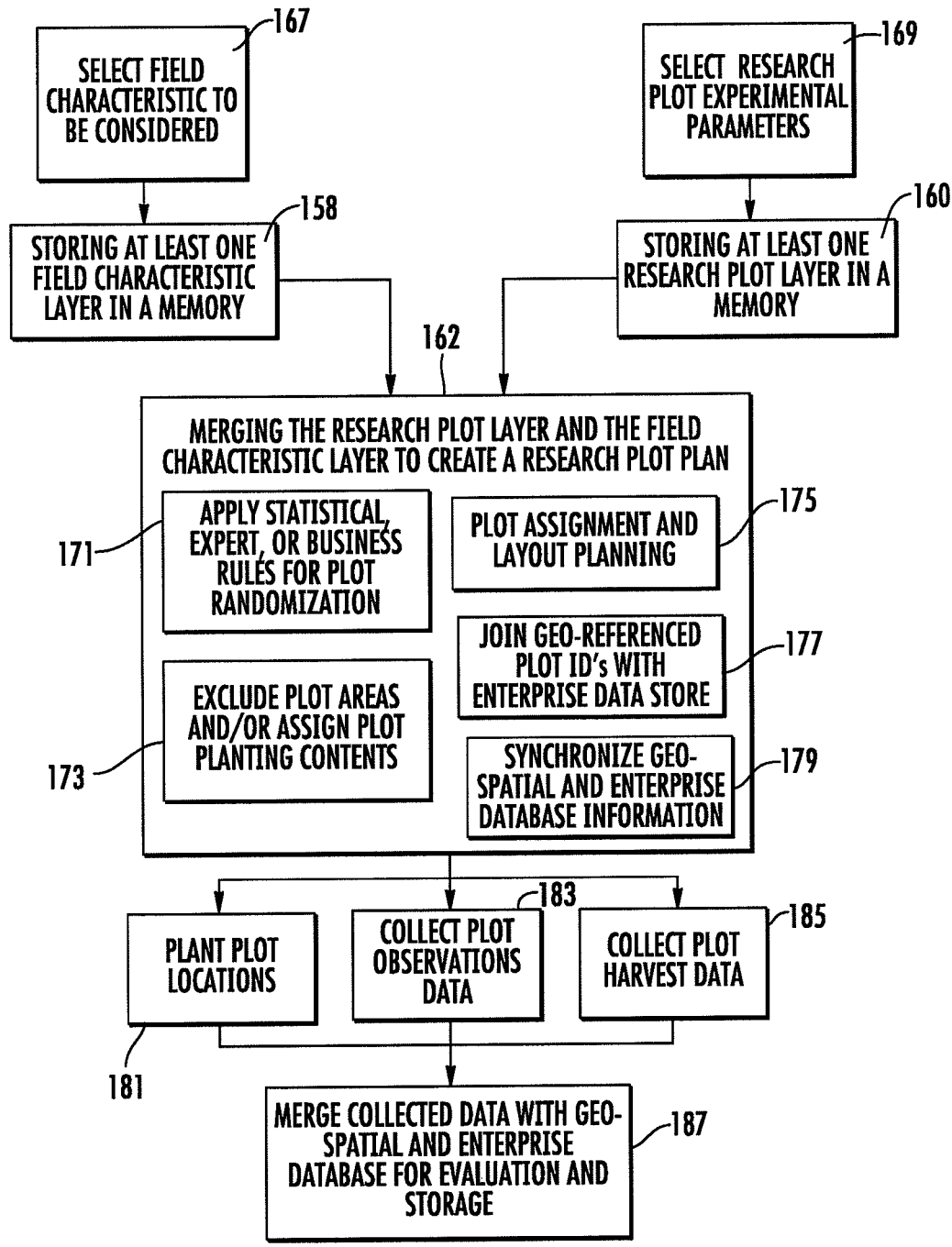
Figure 14:
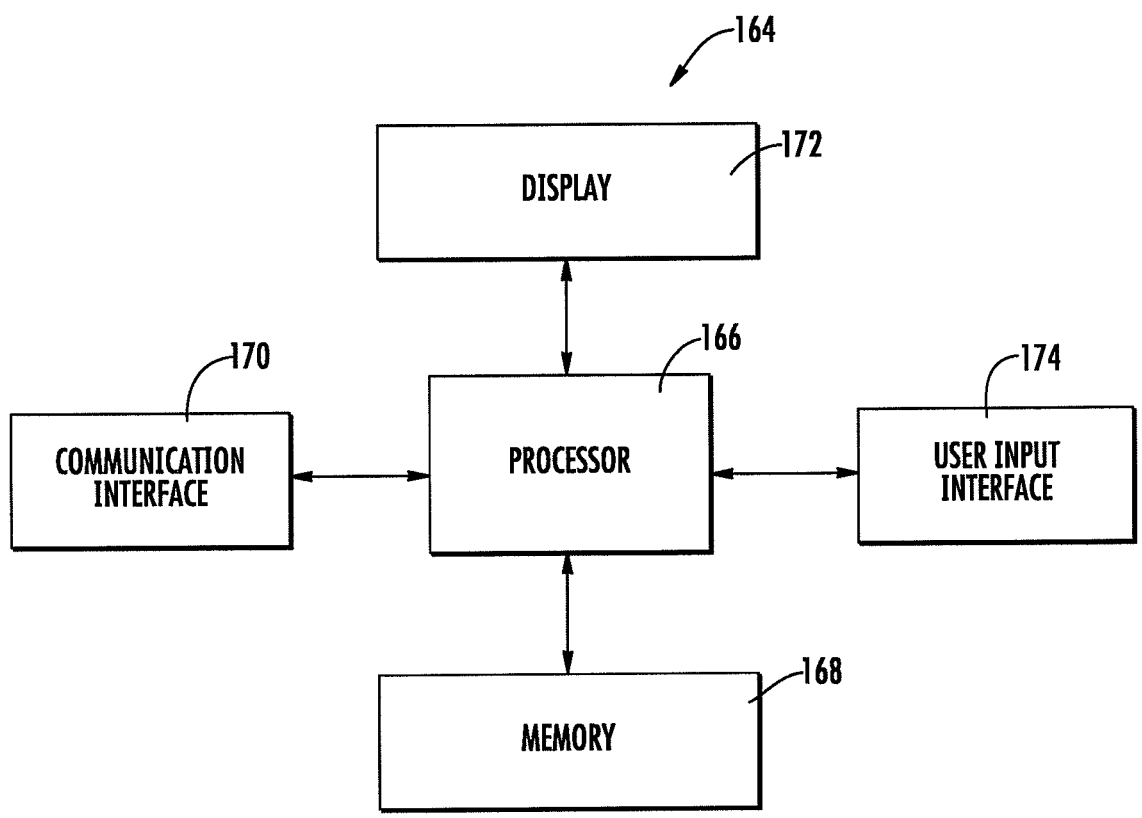
Figure 15:
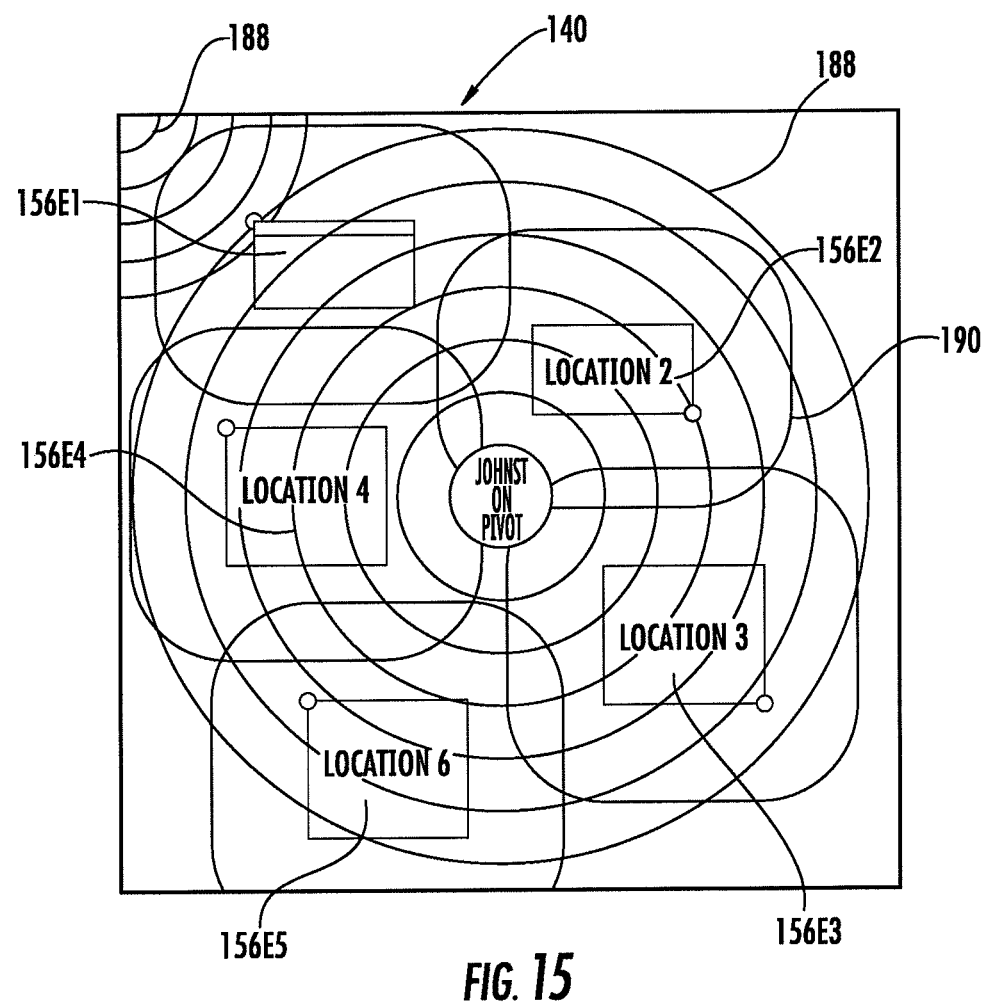
Figure 16:
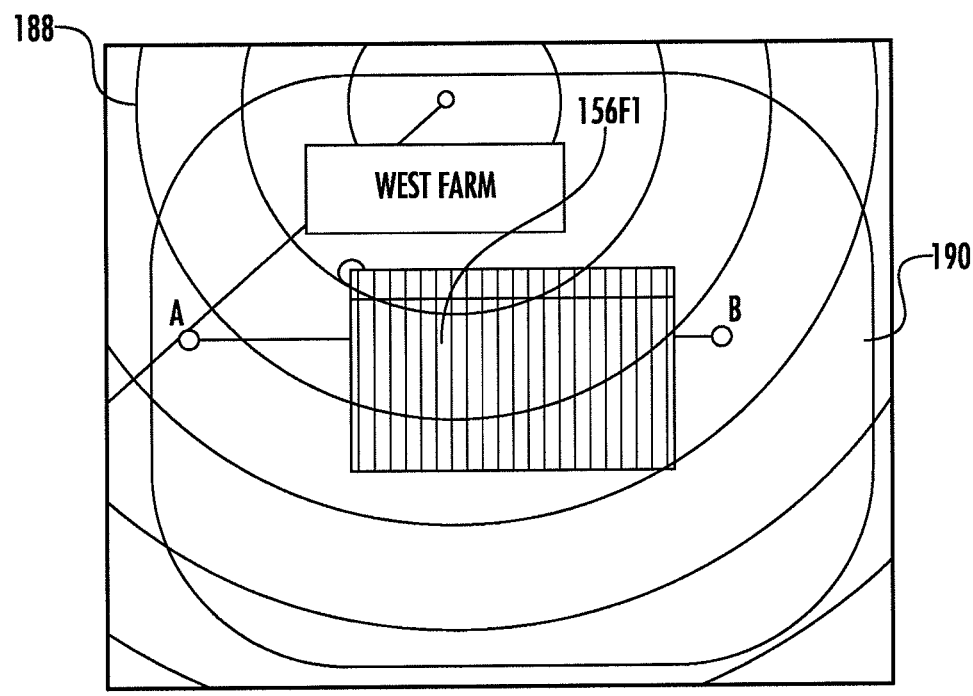

FIG. 2 shows non-limiting examples of geographic information system data as may be used by various embodiments of the present invention;

FIG. 3 shows a non-limiting example of multiple research plot layers in accordance with an embodiment of the present invention;

FIG. 4 shows one research plot layer of FIG. 3 in accordance with an embodiment of the present invention;

FIG. 5 shows another research plot layer of FIG. 3 in accordance with an embodiment of the present invention;

FIG. 6 shows a non-limiting example of multiple field characteristic layers in accordance with an embodiment of the present invention;

FIG. 7 shows one field characteristic layer of FIG. 6 in accordance with an embodiment of the present invention;

FIG. 8 shows another field characteristic layer of FIG. 6 in accordance with an embodiment of the present invention;

FIG. 9 shows a research plot plan created by merging the research plot layers of FIG. 3 and the field characteristic layers of FIG. 6 in accordance with an embodiment of the present invention;

FIG. 10 shows a perspective view of a seed planting device configured for planting rows of seeds in various research plots of a research seed location in accordance with an embodiment of the present invention;

FIG. 11 shows a perspective view of various research plots of a research seed location and an operator gathering plot observations in accordance with an exemplary embodiment of the present invention;

FIG. 12 shows a perspective view of a plant harvesting device harvesting plants from various research plots of a research seed location in accordance with an embodiment of the present invention;

FIG. 13 shows a flowchart showing various steps of managing a research seed location in accordance with an exemplary embodiment of the present invention;

FIG. 14 shows a block diagram of an electronic device configured to execute a method of managing a research seed location in accordance with an embodiment of the present invention;

FIG. 15 shows an example of a research plot plan as may be expressed in one embodiment of a computer program product in accordance with the present invention;

FIG. 16 shows an example of a research plot as may be expressed in one embodiment of a computer program product in accordance with the present invention; and FIG. 17 shows an example of an input interface including various plot data as may be expressed in one embodiment of a computer program product in accordance with the present invention.

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates an example of a typical network environment 100 in which the systems, methods, and computer program products of the present invention may operate. An exemplary embodiment of the present invention may include one or more computing devices 102 connected via a network 101. In the depicted embodiment, the computing devices 102 are connected to a web server 104 and one or more data stores 106 via the network 101. In the depicted embodiment, the one or more data stores 106 comprise an enterprise data store 106A and a geo-data store 106B. It should be noted that although the data stores 106A and 106B are shown as separate data stores, in other embodiments they may comprise a common data store. In addition, although in various embodiments the network 101 may be local network, such as a local area network (LAN), or a broader network, such as a wide are network (WAN), in the depicted embodiment the network 101 is a global system of interconnected computer networks, such as the Internet. In various embodiments, a computing device 102 may be, for example, a computer (e.g., a personal computer (PC), laptop computer, network access terminal, or the like) or may be another form of computing device (e.g., a personal digital assistant (PDA), cellular phone, or the like) capable of communication with the network 101. In various embodiments, a computing device may include a separate processor and memory. In the depicted embodiment the computing devices 102 comprise personal computers (PCs) connected to the network 101.

Also shown in FIG. 1 are several additional systems or devices that, in the depicted embodiment, may communicate with the computing device 102, including a plot treatment operation control and data management system 103, a planter operation control and data management system 105, a plot observation data collection system 107, and a harvest operation and data management system 109. It should be noted that although in the depicted embodiment these components are shown having direct communication with the computing device, in other embodiments one or more of these components may communicate with other components of the network environment 100, including direct communication with the network 101.

The present invention provides a system, method and computer program product for managing a research seed location that comprises storing at least one field characteristic layer in a memory, storing at least one the research plot layer in a memory, and merging the research plot layer and the field characteristic layer via a processor. In various embodiments, the field characteristic layer and the research plot layer may be stored in the same memory or a different memory. The memory may include, for example, volatile and/or non-volatile memory and may be configured to store information, data, applications, instructions or the like for enabling a processor to carry out various functions in accordance with exemplary embodiments of the present invention. In the depicted embodiment, the field characteristic layer and the research plot layer are stored in the geo-data store 106B, and the field characteristic layer and the research plot layer are merged via a processer of the computing device 102. In other embodiments, however, either one or both the field characteristic layer and the research plot layer may be stored in another memory, such as, for example, a memory of the web server 104 (such as, for example, memory 112), a memory of a computing device 102, and/or another data store 106. Additionally, in various other embodiments a different processor may merge the field characteristic layer and the research plot layer, such as, for example, a processor of the computing device.

In various embodiments, a processor may be embodied in a number of different ways. For example, a processor may be embodied as various processing means such as processing circuitry embodied as a processing element, a coprocessor, a controller, a microprocessor, or a microcontroller. In an exemplary embodiment, a processor of the computing device 102 may be configured to execute instructions stored in a memory of the computing device 102. In other embodiments, the processor 108 of the web server 104 may be configured to execute instructions stored in the data store 108 or otherwise accessible to the processor 110. In various embodiments, software instructions may specifically configure the processor 110 to perform algorithms and/or operations to merge the field characteristic layer and the research plot layer. The algorithms and/or operations may include, but need not be limited to, non-linear systems, fuzzy logic, and/or simple Boolean operations that, in some embodiments, may include one or more statistical components.

A field characteristic layer may include field data that describes physical and/or other characteristics of a particular geospatial area. In some embodiments, the field data may be represented in a geographic information system (GIS). A GIS is a system of spatially referenced geographic data that may be represented as a data structure stored in a memory (such as, for example, memory 112 of the web server 104, data store 108 of the webserver 104, data store 106, or a memory of a computing device 102). In the depicted embodiment, the data structure is stored in the geo-data store 106B. Such data may include, but need not be limited to, data relating to ownership boundaries, soil types, drainage areas, obstacles, roads, waterways (such as, for example, streams, ponds, lakes, etc.), field topography, previous yield data, previous treatments, controlled traffic areas, irrigation systems, and combinations thereof. This data may also include other data relating to a particular geospatial area, including, but not limited to, previous yield maps, previous planting arrangements, irrigation patterns, tramlines or control traffic areas, previous field treatments, etc. FIG. 2 shows a non-limiting example of components of a geographic information system 114 that may be used by various embodiments of the present invention. In the depicted embodiment, the data is overlaid on a base map of a geospatial area of interest, such as, for example, a research seed location.

A research plot layer may include plot data that describes characteristics of one or more research plots representing a geospatial area, at least a portion of which, in some embodiments, overlaps with the geospatial area of a field characteristic layer. Plot data may include, for example, crop production input parameters and/or experiment-specific design parameters. In various embodiments, the plot data may be stored in a memory (such as, for example, memory 112 of the web server 104, data store 108 of the web server 104, data store 106, or a memory of a computing device 102). In the depicted embodiment, the plot data is stored in the enterprise data store 106A. In various embodiments, the plot data may be generated prior to and/or after planting a research seed location. Plot data may include, but need not be limited to, experiment boundaries, plot boundaries, desired seed population within a plot, desired seed genetic identity within a plot, field treatments, seed treatments, plant growth data, harvest data, wind resistance data, and combinations thereof. Plot data may also include plant growth data, which may include, but need not be limited to, plant emergence rate, plant germination rate, number of leaves as a function of time, plant height data, ear height data (such as relates to ear corn growth), and combinations thereof.

FIG. 3 shows a non-limiting example of research plot layers 116, 118 representing a geospatial area 120 in accordance with an exemplary embodiment of the present invention. In particular, the research plot layers 116, 118 of FIG. 3 include a research plot layer 116 comprising two experiment boundaries: a first experiment boundary 122 and a second experiment boundary 124, which surround, respectively, a plurality of research plots A1-A5, B1-B5, C1-C5, and D1-D5. Research plot layer 116 including first and second experiment boundaries 122, 124 is shown isolated in FIG. 4. Research plot layer 118 including research plots A1-A5, B1-B5, C1-C5, and D1-D5 is shown isolated in FIG. 5. In the depicted embodiment, plots A1-A5, B1-B5, C1-C5, and D1-D5 are represented by polygons that delineate the plot boundaries 126.

FIG. 6 shows a geospatial area 120 that includes multiple field characteristic layers 128, 136 in accordance with an exemplary embodiment of the present invention. In the depicted embodiment, the field characteristic layers include a field characteristic layer 128 depicting a portion 130 of the geospatial area 120 that has field data representing soil properties of a first type and a portion 132 of the geospatial area 120 that has field data representing soil properties of a second type, and a field characteristic layer 136 that depicts field data that represents a waterway 138 that runs through the geospatial area 120. Field characteristic layer 128 is shown in isolation in FIG. 7. Field characteristic layer 136 is shown in isolation in FIG. 8.

In the depicted embodiment, the field characteristic layers 128, 136, and the research plot layers 116, 118 are merged via a processor (such as, for example, the processor 110 of the web server 104). In the depicted embodiment, the field characteristic layers 128, 136 represent a common geospatial area 120 that comprises a research seed location. Thus, in the depicted embodiment the field characteristic layers 128, 136 and the research plot layers 116, 118 are merged by overlaying the research plot layers 116, 118 with the field characteristic layers 128, 136 (or vice versa), thus creating a research plot plan for the geospatial area 120, which in this embodiment represents a research seed location.

FIG. 9 shows a representation of the research plot plan 140 in which the field characteristic layers 128, 136 have been merged with the research plot layers, 116, 118 in accordance with an embodiment of the present invention. In the depicted embodiment, the research plot plan 140 represents a geospatially aligned combination of all of the data from the field characteristic layers 128, 136 and the research plot layers 116, 118. Therefore, for example, in the depicted embodiment the research plot plan 140 comprises data indicating that certain portions of plots A1 and A2 include soil properties of a first type (based on portion 130 of the field characteristic layer 128), and that certain portions of plots D3, D4, and D5 include soil properties of a second type (based on portion 132 of the field characteristic layer 128). Likewise, the research plot plan 140 of the depicted embodiment comprises data indicating that a waterway runs through certain portions of plots A4, A3, B2, C1, and D1 (based on waterway 138 of the geospatial area 136). In terms of the experiment boundaries, the research plot plan 140 also comprises data indicating that a waterway 138 runs through certain portions of the first and second experiment boundaries 122, 124, that certain portions of the first experiment boundary 122 include soil properties of the first type, and that certain portions of the second experiment boundary include soil properties of the second type.

In some embodiments, the resulting research plot plan may be linked with a research plot database. In some embodiments, the research plot database may be stored in a data store that is in communication with the network. For example, referring to back to FIG. 1, a research plot database may be stored in the enterprise data store 106A. In other embodiments the research plot database may be stored in another data store, such as data store 108 of the web server 104. In various embodiments the research plot database may include a variety of information relating to various research plots planted in different geospatial areas. Such information may include, but need not be limited to, the types of seeds planted in the research plots and/or the source of the seeds. In some embodiments, plot data within a research plot plan may include one or more unique identifiers that may be used to link the research plot plan with the research plot database. For example, in one embodiment each plot boundary may be assigned a unique identifier, and the unique identifiers of the plot boundaries may be used to link to corresponding unique identifiers of a research plot database that includes information relating to the seeds planted in the plot defined by the plot boundaries.

In the depicted embodiment unique identifiers are attributed to each of the plots A1-D5 such that the resulting research plot plan 140 may be linked to a research plot database. In such a manner, the research plot database may aggregate data relating to research plots across a plurality of different research plans. Thus, the research database may be searchable for research plots that have particular attributes. For example, the research plot database may be searchable for all research plots that include soil properties of a first type, or soil properties of a second type, etc. for any of the field or plot data.

It should be noted that for ease of explanation purposes, the embodiments depicted in FIGS. 3-9 have been simplified to include two field characteristic layers and two research plot layers. Although embodiments of the present invention may include a single field characteristic layer and a single research plot layer, it should be noted that the present invention also contemplates other embodiments that may include large numbers of field characteristic layers and research plot layers, resulting in complex matrices of field and plot data, and enabling complex merge logic.

In various embodiments, a seed planting device may be controlled to plant seeds according to the research plot plan. FIG. 10 shows a seed planting device 142 that may used to plant seeds according to a research plot plan in accordance with an exemplary embodiment of the present invention. In the depicted embodiment, the seed planting device 142 is configured to be transported through a research seed location 144 via a farm tractor 146. In the depicted embodiment, the seed planting device 142 is configured to plant four rows of seed 148 in a research plot 150 for each pass of the seed planting device 142. Guidance of the farm tractor 146 in the depicted embodiment is achieved under the control of an autopilot steering system. Although various autopilot steering systems may be used, the depicted embodiment uses an AgGPS autopilot steering system available from Trimble Navigation Limited of Sunnydale, Calif.

It should be noted that in other embodiments, a seed planting device in accordance with the present invention may be configured to plant any number of rows of seed as is commonly known in the art. Examples may include, but need not be limited to, seed planting devices configured to plant sixteen or more rows or more of seed, or seed planting devices configured to plant one row of seed. Additionally, although in the depicted embodiment the seed planting device 142 is configured to be transported via a farm tractor 146, in other embodiments the seed planting device 142 may be transported via another mobile transport device (such as, for example, an all terrain vehicle (ATV), or any another vehicle capable of traveling through a research field). In other embodiments, the seed planting device 142 may be self-propelled, such as, for example, by including an integrated transporting mechanism or device.

As shown in the drawing, the seed planting device 142 in the depicted embodiment is configured to plant as many as four rows of seeds 148 into a research seed plot 150 for each pass of the seed planting device 142 and includes four row planters 152, each one being dedicated for each of the four rows to be planted. However, it should be noted that in other embodiments, a single row planter may provide the seed for two or more rows of the research plot. Although in other embodiments row planters may have other configurations, such as for example, manual seed loading configurations, in the depicted embodiment each row planter 152 includes a seed package handling device 154 that includes a seed tray assembly configured to carry one or more seed package assemblies, with each seed package assembly being configured to contain a research seed sample comprising one or more seeds. A suitable seed handling device and method of operation are described, for example, in U.S. Patent Publication No. 2009/0010750, the contents of which are incorporated herein in its entirety.

In the depicted embodiment, the seed planting device 142 is triggered via a controller. In such a manner, the controller may control the row planters 152 (such as, for example, by controlling the actuation of the seed handling devices 154). In various embodiments, the controller of the seed planting device 142 may have access to one or more research plot plans representing known geospatial areas (such as, for example, various research seed locations). In some embodiments, one or more research plot plans may be stored in a memory of the seed planting device 142. In other embodiments, the seed planting device 142 may access one or more research plot plans over a network (such as network 101 described with respect to FIG. 1). In the depicted embodiment, the controller triggers the seed planting device 142 according to a research plot plan that has been generated for the research seed location 144.

In various embodiments, the seed planting device 142 may include a satellite navigation system, which provides a continuous flow of location information to seed planting device 142 controller. An example of a satellite navigation system may include, but need not be limited to, the global positioning system (GPS) or the International Global Navigation Satellite System (GNSS) Service (IGS). GPS systems enable very accurate location determination or position fixing by utilizing measurements of precise timing signals broadcast from a constellation of more than two dozen GPS satellites in orbit around the earth. Locations can be determined, for example, in terms of longitude, latitude, and altitude regardless of time, weather and position on the earth. Other satellite navigation systems include, but need not be limited to, International Global Navigation Satellite Systems (GNSS) Service (IGS), which have incorporated NAVSTAR satellites of the United States and GLONASS satellites from Russia along with additional satellite constellations to provide robust navigation capability. In general, IGS provides increased precision in location determination and enables the utilization of enhancements in the capabilities of satellite navigation system devices. A Differential Global Positioning System (DGPS) is an enhancement of GPS that incorporates additional ground-based reference stations that allow the calculation of differences between the measured GPS positions and the ground-based fixed locations so that corrections can be made for improved accuracy. Accordingly, it should be understood that, as used herein, the term satellite navigation system is meant to encompass any of a number of different systems including, for example, GPS, IGS, GNSS, NAVSTAR, GLONASS, DGPS, etc. The satellite navigation system of the seed planting device 142 of the depicted embodiment comprises a GPS system that is a component of the autopilot steering system.

As with the research plot plan shown in FIG. 9, in the embodiment depicted in FIG. 10 the research plot plan includes polygons that delineate plot boundaries 155 for plots 156A1-156D5 within the research seed location 144. The research plot plan also includes a guidance line (line A-B in FIG. 10), which is superimposed over the plots 156A1-156D1 and which generally defines the direction of the first pass of the seed planting device 142 through the research seed location. As such, with the autopilot steering system enabled in the research seed location, the autopilot steering system of the depicted embodiment first guides the seed planting device 142 along the line A-B. The autopilot steering system then guides the seed planting device 142 through the other passes in the research seed location. Because the satellite navigation system of the depicted embodiment provides a continuous flow of location information to the controller of the seed planting device 142, as the seed planting device 142 traverses the research seed location 144 and the satellite navigation system recognizes the edge of a plot polygon or a position within a plot polygon, a signal is sent from the seed planting device controller to trigger the row planters 152 to start planting seeds (such as, for example, by actuating the seed handling devices 154). Likewise, when the satellite navigation system recognizes a position outside of a plot polygon, the controller does not trigger the row planters 152. As a result, seeds are planted according to the desired row planting arrangement represented in the research plot plan.

In addition, because field characteristic data of the research plot plan may include such data as obstacles, roads, waterways, etc., which may extend into the plot polygons, (such as, for example, waterway 138 shown in FIG. 9), in various embodiments the seed planting device controller may not trigger the row planters 152 in these areas.

In some embodiments, the satellite navigation system may be used to capture the geospatial location of the seeds as they are planted in the research seed location. For example, upon triggering the row planters 152, the geospatial location of the seed planting device 142 may be captured. In other embodiments, a sensor may send a signal to the seed planting device controller for each seed planted in the research seed location such that the geospatial locations of the planted seeds may be captured. In any event, an "as-planted" seed map may be created. In such embodiments, the as-planted seed map may be compared to the research plot plan. In various embodiments, this comparison may be performed manually or via a processor (such as, for example, processor 110 of the web server 104 of FIG. 1 or a processor of a computing device 102.)

In various embodiments, it may be advantageous to gather data about plants that grow from the seeds planted in the research seed location 144 as the plants proceed through a growing cycle. FIG. 11 shows a perspective view of research plots 156A1-156D5 of the research seed location 144 sometime after the seeds have been planted in the plots. In the depicted embodiment, an operator 157 may gather plot observation data regarding one or more plants 159 planted in the plots 156A1-156D5. In various embodiments, plot observation data may be gathered through visual inspections of the plants 159 in the plots 156 and/or through various testing of the plants 159. Examples of plot observation data may include, but need not be limited to, data relating to plant emergence rate, heat unit exposure, herbicide tolerance, nitrogen utilization, corn plant ear node location, plant height, level of insect and/or fungal infestation, etc.

Data from these observations and/or tests may be entered into a computing device 161 that may comprise a plot observation data collection system. Although in various embodiments, a computing device may have a variety of configurations, in the depicted embodiment, the computing device 161 is a mobile computing device (e.g., a portable data collector, a personal digital assistant (PDA), cellular phone, or the like), which allows the operator 157 to enter plot observation data while the operator 157 is positioned at or near the research seed location 144 or while the operator 157 is moving about the research seed location 144. In various embodiments, the computing device 161 may be configured to communicate with one or more components of the network environment 100. In the depicted embodiment, the computing device 161 communicates directly with computing device 102 (as shown by element 107 in FIG. 1). In other embodiments, however, the computing device 161 may be able to communicate directly with other components of the network environment 100, and in some embodiments the computing device 161 may communicate over the network 101. In various embodiments, plot observation data may be correlated with a research plot plan, such as by utilizing the unique identifier associated with the plots and/or by synchronizing the locations of the observed plants with the locations of the plants as defined in the research plot plan. For example, in some embodiments this may be accomplished via a mobile computing device having GPS capability.

In various embodiments, it may also be advantageous to gather harvest data about plants that grow from the seeds planted in the research seed location 144. FIG. 12 shows a perspective view of a harvesting device 163 configured to harvest grown plants 165 from the plots 156A1-156D5 of the research seed location 144. (It should be noted that in order to simply the figure, grown plants 165 are not shown in plots 156A2-156D5, however one skilled in the art would recognize that grown plants 165 would exist in plots 156A2-156D5 until harvested by the harvesting device 163.) Harvest data may include, but need not be limited to, grain yield, grain weight, grain moisture, grain size, grain shape, grain color, grain genetics, etc. In various embodiments, harvest data may be entered into a computing device that may comprise a harvest operation and data management system and that may communicate with computing device 102 directly (as shown by element 109 in FIG. 1) or indirectly, such as by communicating with other components of the network environment 100 or by communicating over the network 101. In various embodiments, harvest data may also be correlated with a research plot plan, such by utilizing the unique identifier associated with the plots and/or by synchronizing the location of the plants harvested by the harvesting device 163 with the locations of the plants as defined in the research plot plan. In some embodiments, this may be accomplished via a harvest device having GPS capability. As such, some embodiments may be capable of harvest plot position verification wherein the position of the plot being harvested may be verified against the intended position of the plot.

Although in various embodiments, the harvesting device may have other configurations, in the depicted embodiment the harvesting device 163 is guided under the control of an autopilot steering system. As such, a guidance line (line A'-B' in FIG. 12), generally defines the direction of the first pass of the harvesting device 163 through the research seed location 144. With the autopilot steering system enabled in the research seed location 144, the autopilot steering system of the depicted embodiment first guides the harvesting device 163 along the line A'-B'. The autopilot steering system then guides the harvesting device 163 through the other passes in the research seed location 144.

FIG. 13 shows a flowchart that includes various steps for managing a research seed location in accordance with an embodiment of the present invention and as described above. Block 167 comprises selecting the field characteristics to be considered; block 169 comprises selecting the research plot experimental parameters; block 158 comprises storing at least one field characteristic layer in a memory; block 160 comprises storing at least one research plot layer in a memory; and block 162 comprises merging the research plot layer and the field characteristic layer to create a research plot plan. In various embodiments, block 162 may include, for example, one or more of the following: applying statistical, expert, or business rules for plot randomization (block 171), excluding plot areas and/or assigning plot planting contents (block 173), assigning plots and planning a layout (block 175), joining geo-referenced plot identifiers with the enterprise data store (block 177), and/or synchronizing geo-spatial and enterprise database information (block 179). Block 181 comprises planting seeds in the plot locations; block 183 comprises collecting plot observations data; block 185 comprises collecting plot harvest data; and block 187 comprises merging the collected data with the geo-data data store and the enterprise data store for evaluation and storage. It should be noted that no assumptions should be made with respect to the order that the steps depicted in FIG. 11 are performed. As such, in some embodiments either the field characteristic layer(s) or the research plot layer(s) may be stored first. In other embodiments, the field characteristic layer(s) and the research plot layer(s) may be stored concurrently. In still other embodiments, portions of either the field characteristic layer(s) or the research plot layer(s) may be stored before and/or after other portions thereof.

The foregoing merely illustrates how exemplary embodiments of the present invention provide a method for managing a research seed location. Referring now to FIG. 14, a block diagram of an exemplary electronic device (e.g., PC, laptop, PDA, etc.) 164 configured to execute the method of managing a research seed location of exemplary embodiments of the present invention are shown. (For example, in the embodiment depicted in FIG. 1, the electronic device may comprise the computing device 102.) The electronic device 164 may include various means for performing one or more functions in accordance with exemplary embodiments of the present invention, including those more particularly shown and described herein. It should be understood, however, that the electronic device may include alternative means for performing one or more like functions, without departing from the spirit and scope of the present invention. As shown, the electronic device may generally include means, such as a processor, controller, or the like 166 connected to a memory 168, for performing or controlling the various functions of the entity.

The memory can comprise volatile and/or non-volatile memory, and typically stores content, data or the like. For example, the memory typically stores content transmitted from, and/or received by, the electronic device. Also for example, the memory typically stores software applications, instructions or the like for the processor to perform steps associated with operation of the electronic device in accordance with embodiments of the present invention. In particular, the memory 168 may store computer program code for an application and other computer programs. For example, in one exemplary embodiment of the present invention, the memory may store computer program code for, among other things, storing at least one field characteristic layer, storing at least one research plot layer, and merging the field characteristic layer and the research plot layer to create a research plot plan.

In addition to the memory 168, the processor 166 can also be connected to at least one interface or other means for displaying, transmitting and/or receiving data, content or the like. In this regard, the interface(s) can include at least one communication interface 170 or other means for transmitting and/or receiving data, content or the like, as well as at least one user interface that can include a display 172 and/or a user input interface 174. The user input interface, in turn, can comprise any of a number of devices allowing the electronic device to receive data from a user, such as a keypad, a touch display, a joystick or other input device.

As described above and as will be appreciated by one skilled in the art, embodiments of the present invention may be configured as a method and system. Accordingly, embodiments of the present invention may be comprised of various means including entirely of hardware, entirely of software, or any combination of software and hardware. Furthermore, embodiments of the present invention may take the form of a computer program product consisting of a computer-readable storage medium (e.g., the memory 168 of FIG. 14) and computer-readable program instructions (e.g., computer software) stored in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 15 shows an example of a research plot plan as may be expressed in one embodiment of a computer program product in accordance with the present invention. In particular, FIG. 15 shows a screenshot of a research plot plan 140 in which one or more field characteristic layers have been merged with one or more research plot layers. The research plot plan 140 of the depicted embodiment includes five plots 156E1-156E5, which may be part of the one or more research plot layers. The research plot plan 140 of the depicted embodiment also includes an irrigation pattern, in this case center pivot irrigation track lines 188, which may be part of the one or more field characteristic layers. Also shown are boundary lines 190 that may be depicted in order to show regulatory distance requirement areas around each plot. In various embodiments, these boundary areas may be user-defined and, in some embodiments, may be according to local or federal government and/or administrative regulations.

FIG. 16 shows an example of a research plot as may be expressed in one embodiment of a computer program product in accordance with the present invention. In particular, FIG. 16 shows a screenshot of a portion of a research plot plan in which one or more field characteristic layers have been merged with one or more research plot layers. In the depicted embodiment, the portion of the research plot plan shown includes a research plot 156F1, which may be part of the one or more research plot layers. The portion of the research plot plan depicted in FIG. 16 also shows center pivot irrigation track lines 188, which may be part of the one or more field characteristic layers, as well as a boundary line 190. The embodiment depicted in FIG. 16 also shows a guidance line (line A-B), which is superimposed over plot 156F1 and which generally defines the direction of the first pass of the seed planting device through the research seed location.

Figure 17:
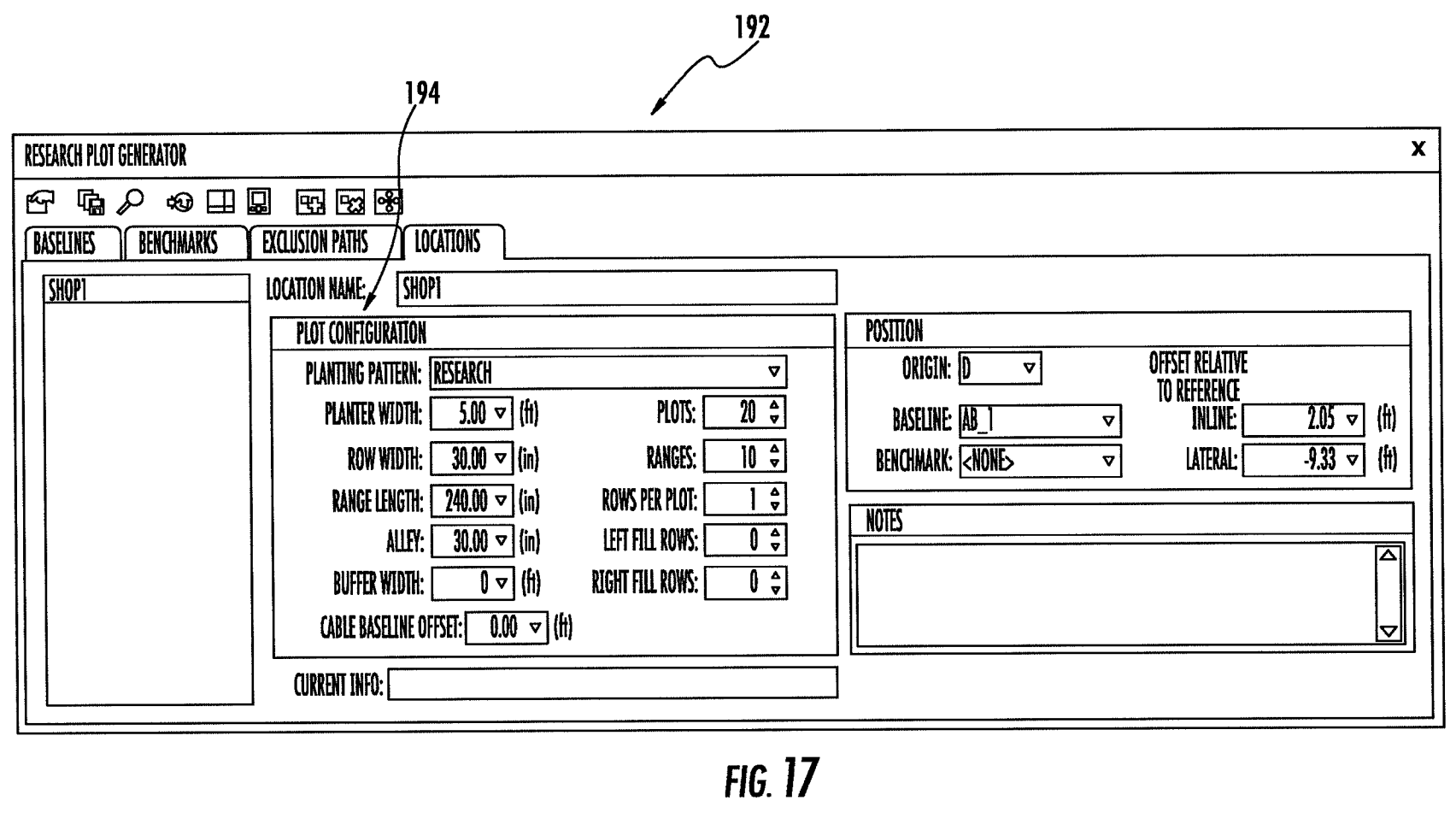

FIG. 17 shows an example of an input interface including various plot data as may be expressed in one embodiment of a computer program product in accordance with the present invention. In particular, FIG. 17 shows a screenshot of an input window 192 that allows a user to enter and/or edit various plot data 194 associated with a research plot. In the depicted embodiment, some of the plot data 192 includes: a planting pattern, a planter width, a row width, a range length, an alley size, a buffer width, a cable baseline offset, the number of plots, the number of ranges, the number of rows per plot, the number of left fill rows, and the number of right fill rows.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of managing a research seed location, said method comprising:
   storing at least one field characteristic layer in a memory, the field characteristic layer representing a geospatial area;
   storing at least one research plot layer in a memory, the research plot layer also representing a geospatial area and including plot data having a unique identifier;
   merging the research plot layer and the field characteristic layer via a processor to create a research plot plan for the research seed location;
   linking the research plot plan with a research plot database using the unique identifier;
   outputting the research plot plan in response to a query of the research plot database using an attribute; and
   providing the outputted research plot plan to control a seed planting device.

2. The method of managing a research seed location of claim 1, wherein the field characteristic layer includes field data selected from the group consisting of:
- ownership boundaries;
- soil types;
- drainage areas;
- obstacles;
- waterways;
- field topography;
- previous yield data;
- previous field treatments;
- tramlines/controlled traffic areas;
- irrigation patterns;
- and combinations thereof.

3. The method of managing a research seed location of claim 1, wherein the research plot layer includes plot data selected from the group consisting of:
- experiment boundaries;
- plot boundaries;
- desired seed population within a plot;
- desired seed genetic identity within a plot;
- field treatments;
- seed treatments;
- plant growth data;
- harvest data;
- wind resistance data;
- and combinations thereof.

4. The method of managing a research field of claim 3, wherein the plot data includes plant growth data, and wherein the plant growth data is selected from the group consisting of:
- plant emergence rate;
- plant germination rate;
- number of leaves as a function of time;
- plant height data;
- ear height data;
- and combinations thereof.

5. The method of managing a research field of claim 1, wherein at least a portion of the geospatial area of the field characteristic layer and the geospatial area of the research plot layer overlap.

6. The method of managing a research seed location of claim 1, wherein merging the research plot layer and the field characteristic layer comprises applying an algorithm to the field characteristic layer and the research plot layer.

7. The method of managing a research seed location of claim 1, further comprising controlling a seed planting device to plant seeds according to the research plot plan.

8. The method of managing a research seed location of claim 7, wherein the research plot layer includes one or more plot boundaries and wherein controlling the seed planting device comprises controlling the seed planting device to plant seeds within the plot boundaries.

9. The method of managing a research seed location of claim 8, wherein the plot boundaries are represented by polygons.

10. The method of managing a research seed location of claim 1, further comprising collecting at least one of plant observation data and plant harvest data, and merging the collected data with the research plot plan.

11. The method of managing a research seed location of claim 1, further comprising recording the geospatial location of seeds planted in the research seed location to create an as-planted map.

12. The method of managing a research seed location of claim 11, further comprising comparing the research plot plan to the as-planted map.

13. A computer program product comprising at least one computer-readable storage medium having computer-executable program code instructions stored therein, said computer-executable program code instructions comprising:
- program code instructions for storing at least one field characteristic layer in a memory, the field characteristic layer representing a geospatial area;
- program code instructions for storing at least one research plot layer in a memory, the research plot layer also representing a geospatial area and including plot data having a unique identifier;
- program code instructions for merging the research plot layer and the field characteristic layer to create a research plot plan for the research seed location; and
- program code instructions for linking the research plot plan with a research plot database using the unique identifier;
- program code instructions for outputting the research plot plan in response to a query of the research plot database using an attribute; and
- program code instructions for providing the outputted research plot plan to control a seed planting device.

14. The computer program product of claim 13, wherein the field characteristic layer includes field data selected from the group consisting of:
- ownership boundaries;
- soil types;
- drainage areas;
- obstacles;
- waterways;
- field topography;
- previous yield data;
- previous field treatments;
- tramlines/controlled traffic areas;
- irrigation patterns;
- and combinations thereof.

15. The computer program product of claim 13, wherein the research plot layer includes plot data selected from the group consisting of:
- experiment boundaries;
- plot boundaries;
- desired seed population within a plot;
- desired seed genetic identity within a plot;
- field treatments;
- seed treatments;
- plant growth data;
- harvest data;
- wind resistance data;
- and combinations thereof.

16. The computer program product of claim 15, wherein the plot data includes plant growth data, and wherein the plant growth data is selected from the group consisting of:
- plant emergence rate;
- plant germination rate;
- number of leaves as a function of time;
- plant height data;
- ear height data;
- and combinations thereof.

17. The computer program product of claim 13, wherein at least a portion of the geospatial area of the field characteristic layer and the geospatial area of the research plot layer overlap.

18. The computer program product of claim 13, wherein the program code instructions for merging the research plot layer and the field characteristic layer include instructions for applying an algorithm to the field characteristic layer and the research plot layer.

19. The computer program product of claim 13, further comprising program code instructions for controlling a seed planting device to plant seeds according to the research plot plan.

20. The computer program product of claim 19, wherein the research plot layer includes one or more plot boundaries and wherein the program code instructions for controlling the seed planting device include instructions for controlling the seed planting device to plant seeds within the plot boundaries.

21. The computer program product of claim 13, further comprising program code instructions for merging collected data comprising at least one of plant observation data and plant harvest data with the research plot plan.

22. The computer program product of claim 13, further comprising program code instructions for recording geospatial locations of seeds planted in the research seed location and program code instructions for creating an as-planted map.

23. The computer program product of claim 22, further comprising program code instructions for comparing the research plot plan to the as-planted map.

* * * * *